United States Patent [19]

Johannsen

[11] Patent Number: 4,897,903

[45] Date of Patent: Feb. 6, 1990

[54] METHOD OF PROVIDING AN INK JET PRINTING HEAD WITH PIEZO-CRYSTALS

[75] Inventor: Fred Johannsen, Varel, Fed. Rep. of Germany

[73] Assignee: Olympia Aktiengesellschaft, Wilhelmshaven, Fed. Rep. of Germany

[21] Appl. No.: 309,082

[22] Filed: Feb. 10, 1989

[30] Foreign Application Priority Data

Feb. 11, 1988 [DE] Fed. Rep. of Germany ....... 3804165

[51] Int. Cl.[4] .......................... B41J 3/04; G01D 15/18

[52] U.S. Cl. ................................ 29/25.35; 346/140 R

[58] Field of Search .......................... 346/1.1, 140 PD; 29/25.35

[56] References Cited

U.S. PATENT DOCUMENTS

| | | | |
|---|---|---|---|
| 4,504,845 | 3/1985 | Kattner et al. | 29/25.35 X |
| 4,599,628 | 7/1986 | Doring et al. | 346/140 PD |
| 4,605,939 | 8/1986 | Hubbard et al. | 346/140 PD |
| 4,641,153 | 2/1987 | Cruz-Uribe | 346/140 PD |
| 4,668,964 | 5/1987 | Padalino et al. | 29/25.35 X |
| 4,751,774 | 6/1988 | De Young et al. | 29/25.35 |
| 4,768,266 | 9/1988 | De Young | 29/25.35 |

FOREIGN PATENT DOCUMENTS

| | | |
|---|---|---|
| 2164614 | 4/1974 | Fed. Rep. of Germany . |
| 2256667 | 4/1975 | Fed. Rep. of Germany . |

*Primary Examiner*—George H. Miller, Jr.

*Attorney, Agent, or Firm*—Spencer & Frank

[57] ABSTRACT

A method of providing an ink jet printing head with piezo-crystals comprises the steps of providing a plate-shaped basic printing head body including an ink supply reservoir, ink pressure chambers, ink exit openings, ink outlet channels which connect the pressure chambers with the ink exit openings, and ink inlet channels for connecting the pressure chambers with the ink supply chamber; providing a membrane plate; providing an piezo-ceramic plate; attaching the piezo-ceramic plate face-to-face to the membrane plate; attaching the membrane plate face-to-face to the basic body; and subsequent to attaching the piezo-ceramic plate to the membrane plate, entirely separating piezo-crystals from the piezo-ceramic plate by providing closed-course cuts through the piezo-ceramic plate such that a separate piezo-crystal is obtained in alignment with each pressure chamber.

7 Claims, 2 Drawing Sheets

METHOD OF PROVIDING AN INK JET PRINTING HEAD WITH PIEZO-CRYSTALS

CROSS REFERENCE TO RELATED APPLICATION

This application claims the priority of Federal Republic of Germany Application No. P 38 04 165.0 filed Feb. 11th, 1988, which is incorporated herein by reference.

BACKGROUND OF THE INVENTION

The present invention relates to a method of providing an ink jet printing head with piezo-crystals which control the release of ink. The jet printing head is of the type having a plate-shaped basic body that includes a plurality of ink-filled pressure chambers and ink channels which connect the pressure chambers with outlet openings and an ink supply chamber. The printing head further has a membrane plate which is firmly secured to the basic body and is actuated by piezo-crystals for reducing the volume of the pressure chambers. The piezo-crystals are arranged on the membrane plate above the pressure chambers.

In a prior art ink jet printing head, such as disclosed in German Pat. No. 2,164,614, liquid ink-filled chambers are covered by individual membranes composed of thin metal plates. Individual piezo-electric crystals configured as electromechanical transducer devices are fastened to these metal plates. Such a printing head, equipped with, for example, seven printing units, has many individual parts which must be installed in several process steps. This process requires a high degree of skill on the part of the operator performing the installation, particularly since the plates of piezo-electric material are very small and are easily damaged. Further, the fragile plates must be installed and aligned with great accuracy.

Some of the above-mentioned drawbacks are overcome by the device taught in German Pat. No. 2,256,667. This patent teaches the use of a membrane plate which is connected with a one-piece piezo-ceramic plate to cover all of the pressure chambers. The piezo-ceramic plate can be locally activated by electrodes disposed on its surface in the region of the individual pressure chambers to activate individual chambers. The piezo-ceramic plate is provided with raised portions equipped with individual electrodes in the region of each of the individual fluid chambers. The respective raised portions of the piezo-ceramic plate have planar dimensions which correspond to the dimensions of the pressure chambers disposed in a base plate underneath them. If these dimensions are reduced to thus increase the density of the ink channels or pressure chambers in the basic body, the oscillating behavior of the piezo-ceramic raised portions is greatly influenced when the electrode layers are contacted by means of electrical wires. This prior art piezo-ceramic plate is easily installed but its manufacture is very expensive. Further, since the individual piezo-crystals are all fixed to a common piezo-ceramic plate, a relatively high voltage is required for compressing the chambers.

SUMMARY OF THE INVENTION

It is an object of the present invention to provide a method of easily and rapidly providing an ink jet printing head with piezo-crystals and to ensure reliable and accurate positioning of the piezo-crystals.

This object and others to become apparent as the specification progresses, are accomplished by the invention, according to which, briefly stated, the method of providing an ink jet printing head with piezo-crystals comprises the steps of providing a plate-shaped basic printing head body including an ink supply reservoir, ink pressure chambers, ink exit openings, ink outlet channels which connect the pressure chambers with the ink exit openings, and ink inlet channels for connecting the pressure chambers with the ink supply chamber; providing a membrane plate; providing a piezo-ceramic plate; attaching the piezo-ceramic plate face-to-face to the membrane plate; attaching the membrane plate face-to-face to the basic body; and subsequent to attaching the piezo-ceramic plate to the membrane plate, entirely separating piezo-crystals from the piezo-ceramic plate by providing closed-course cuts through the piezo-ceramic plate such that a separate piezo-crystal is obtained in alignment with each pressure chamber.

The method according to the invention is distinguished in that the piezo-crystals are no longer aligned and installed individually but that they are handled as one subassembly component during installation. Only after the piezo-ceramic plate is fastened to the membrane plate, are the piezo-crystals separated from the piezo-ceramic plate. Each piezo-crystal is then able to freely oscillate independently of the other crystals or the plates.

The base plate and piezo-members are advantageously designed with a common configuration to assure proper alignment so that the danger of incorrect polarization by the asymmetrical shape of the piezo-crystal plate is excluded. The flush attachment of the piezo-ceramic plate on the membrane plate of the ink jet printing head eliminates any positioning problems.

BRIEF DESCRIPTION OF THE DRAWINGS

FIG. 8 is a top plan view of the ink jet printing head of FIG. 1 after separating out the piezo-crystals from the piezo-ceramic plate.

DESCRIPTION OF THE PREFERRED EMBODIMENT

Figure 1:
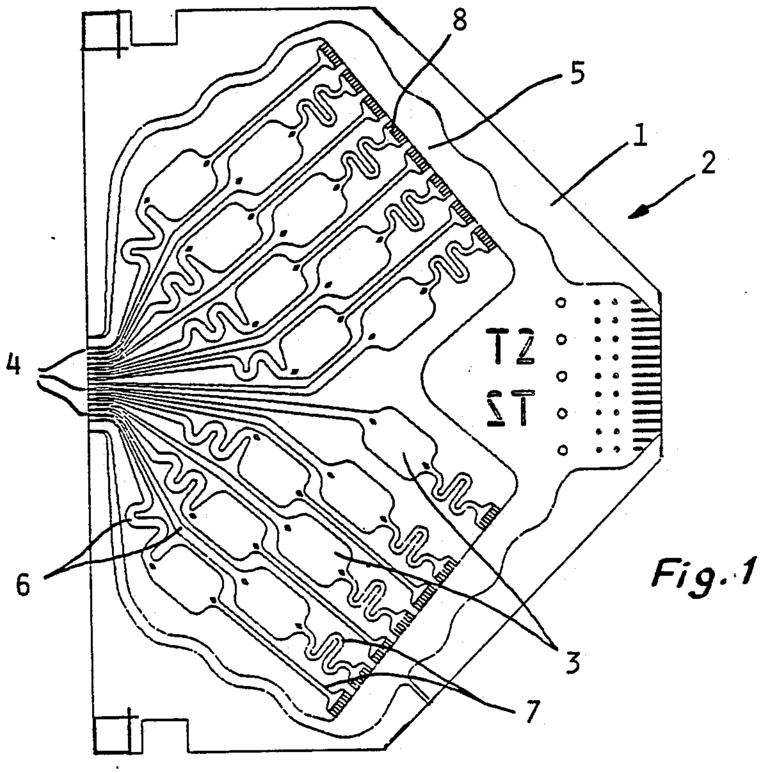
FIG. 1 is a top plan view of a plate-shaped basic body forming part of an ink jet printing head and having ink channels and pressure chambers.

FIG. 1 illustrates a plate-shaped basic glass body 1 of an ink jet printing head 2 shown in section in which a plurality of ink-filled pressure chambers 3 are disposed together with ink outlet channels 6, and inlet channels 7 connecting the pressure chambers with exit openings 4 and with an ink supply reservoir 5, respectively. Filters 8 are disposed at the points of transition between ink channels 7 and ink reservoir 5 to prevent the entrance of air into pressure chambers 3.

Figure 2:
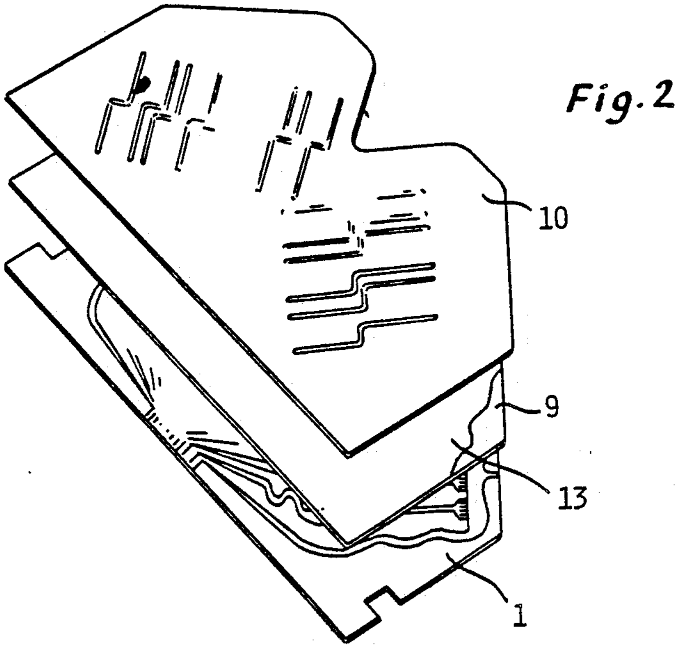
FIG. 2 is an exploded perspective view illustrating components of the ink jet printing head.
Figure 3:
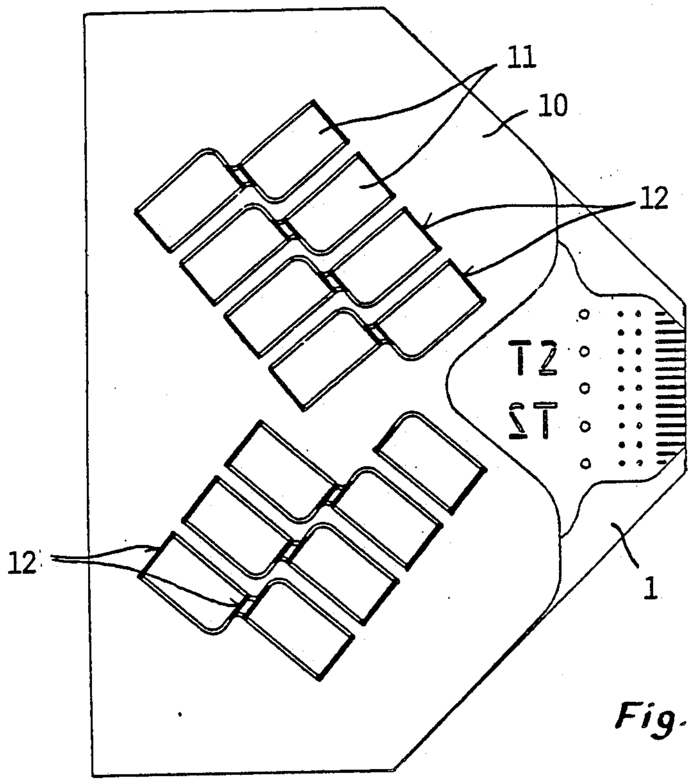

Turning now to FIGS. 2 and 3, a membrane plate 9, also made of glass, is fixed to basic body 1 so as to cover pressure chambers 3, ink channels 6, 7 and reservoir 5 in a liquid-tight manner. The top surface of membrane plate 9, to be in contact with a piezo-ceramic plate 10, is provided with a zinc oxide layer 13. Piezo-ceramic plate 10 is firmly bonded to membrane plate 9, for example by means of an adhesive. Then individual piezo-crystals 11 are separated out of the piezo-ceramic plate 10 by means of closed-line cuts provided in the plate by a separating device. By virtue of this arrangement, the separated piezo-crystals 11 are independently freely oscillating.

The separating device may, for example, be a laser beam device, for example, a $CO_2$ laser. This separating device has the advantage that the material to be removed from the separating cuts is evaporated. In the alternative, appropriate grinding machines may be used for separation. However, a laser beam device can be controlled in such a way, for example by a numerical control, that piezo-crystals 11 can be given any desired geometric shape.

As an advantageous alternative feature, before piezo-ceramic plate 10 is fastened to membrane plate 9, piezo-crystals 11 can be pre-separated from piezo-ceramic plate 10 except for at least one connecting web 12 illustrated in FIG. 3, for each crystal. The final separation of piezo-crystals 11 is effected after piezo-ceramic plate 10 is fastened to membrane plate 9 in that the connecting webs are severed by means of a separating device. This has the advantage that zinc oxide layer 13 which serves as a conductive coating on membrane plate 9 is not damaged by the separation process to such an extent that the electrically conductive connection with the individual piezo-crystals 11 would be interrupted. Advantageously, the connecting webs 12 are so located that they are externally of the outlines of the pressure chambers 3, inlet channel 7 and outlet channels 6, that is, they are situated above a solid (non-cavernous) portion of the basic body 1.

Basic body 1, membrane plate 9 and piezo-ceramic plate 10 in part have the same outer contours so that they can be assembled and connected in alignment with one another. This has the advantage that separate positioning of the individual crystals is no longer necessary. Before ink jet head 2 is equipped with piezo-crystals, the plate-shaped basic body 1 and membrane plate 9 are firmly bonded to one another, for example by means of an adhesive. Before such bonding membrane plate 9 is provided with an electrically conductive coating, for example, a nickel oxide layer 13.

Then the piezo-ceramic plate 10, which has already been provided with laser cuts, is firmly bonded to membrane plate 9 likewise by means of an adhesive. Then the connecting webs 12 in the separating cuts are severed by means of a laser beam device, causing the piezo-crystals 11 disposed above each pressure chamber 3 to be entirely separated from piezo-ceramic plate 10 to thus become freely oscillating. All piezo-crystals 11 of ink jet printing head 2 are thus assembled into one installable component and are glued to membrane plate 9. The proper amount of adhesive is ensured by means of a squeegee, screen printing or by a centrifuging process.

The method according to the invention also ensures the correct planar positioning of piezo-crystals 11 relative to membrane plate 9 which is required for uniform operating voltages. Pressure chambers 3 and ink channels 6 and 7 as well as ink reservoir 5 are worked into basic body 1, for example, by way of an etching process. The connection of membrane plate 9 with the basic body 1 may also be effected by means of a sintering process.

It will be understood that the above description of the present invention is susceptible to various modifications, changes and adaptations, and the same are intended to be comprehended within the meaning and range of equivalents of the appended claims.

What is claimed is:

1. A method of providing an ink jet printing head with piezo-crystals comprising the steps of:

(a) providing a plate-shaped basic printing head body including an ink supply reservoir, ink pressure chambers, ink exit openings, ink outlet channels which connect said pressure chambers with said ink exit openings, and ink inlet channels for connecting said pressure chambers with said ink supply chamber, (b) providing a membrane plate, (c) providing a piezo-ceramic plate, (d) attaching said piezo-ceramic plate face-to face to said membrane place, (e) attaching said membrane plate face-to-face to said basic body, and (f) subsequent to step (d), entirely separating piezo-crystals from said piezo-ceramic plate by providing closed-course cuts through said piezo-ceramic plate such that a separate piezo-crystal is obtained in alignment with each said pressure chamber.

2. A method as defined in claim 1, further comprising the step of partially separating, prior to step (d), piezo-crystals from said piezo-ceramic plate by providing cuts through said piezo-ceramic plate such that piezo-crystals are separated from said piezo-ceramic plate except for a connecting web; said step (f) comprising the step of severing each connecting web.

3. A method as defined in claim 2, wherein the said partially separating step comprises the step of locating said connecting webs such that subsequent to steps (d) and (e) each said connecting web is situated externally of outlines of said chambers, inlet channels and outlet channels.

4. A method as defined in claim 1, wherein step (f) is performed by a laser beam device.

5. A method as defined in claim 1, wherein step (f) is performed by a cutting device controllable by a numerical control device such that the piezo-crystals can be given any desired geometric shape.

6. A method as defined in claim 1, wherein the membrane plate is of glass and is provided with a zinc oxide coating on the side adjacent said piezo-ceramic plate.

7. A method as defined in claim 1, further comprising the step of shaping the basic body, the membrane plate and the piezo-ceramic plate such that in part they have identical outer contours; steps (d) and (e) comprising the steps of aligning the identical contours with one another.

* * * * *